(12) United States Patent
Iwatani et al.

(10) Patent No.: US 12,428,150 B2
(45) Date of Patent: Sep. 30, 2025

(54) ELECTRIC FAN AND ELECTRIC VERTICAL TAKEOFF/LANDING AIRCRAFT

(71) Applicant: MITSUBISHI HEAVY INDUSTRIES, LTD., Tokyo (JP)

(72) Inventors: Junji Iwatani, Tokyo (JP); Kai Karikomi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 11 days.

(21) Appl. No.: 18/566,342

(22) PCT Filed: Jul. 12, 2022

(86) PCT No.: PCT/JP2022/027464
§ 371 (c)(1),
(2) Date: Dec. 1, 2023

(87) PCT Pub. No.: WO2023/286785
PCT Pub. Date: Jan. 19, 2023

(65) Prior Publication Data
US 2024/0246668 A1    Jul. 25, 2024

(30) Foreign Application Priority Data
Jul. 15, 2021  (JP) ................................. 2021-117367

(51) Int. Cl.
*B64C 29/00* (2006.01)
*B64C 27/32* (2006.01)
(Continued)

(52) U.S. Cl.
CPC .......... *B64C 29/0033* (2013.01); *B64C 27/32* (2013.01); *B64D 27/31* (2024.01);
(Continued)

(58) Field of Classification Search
CPC ................................................... F05D 2220/90
See application file for complete search history.

(56) References Cited

U.S. PATENT DOCUMENTS

| 11,691,743 B2 * | 7/2023 | Karikomi | .............. F04D 25/066 |
| | | | 417/423.12 |
| 2007/0034738 A1 | 2/2007 | Sanders et al. | |

(Continued)

FOREIGN PATENT DOCUMENTS

| JP | 2005010494 A | 1/2005 |
| JP | 2020093705 A | 6/2020 |
| WO | 2021131196 A1 | 7/2021 |

OTHER PUBLICATIONS

International Search Report issued in corresponding International Application No. PCT/JP2022/027464, dated Sep. 13, 2022 (5 pages).
(Continued)

*Primary Examiner* — Danielle M. Christensen
(74) *Attorney, Agent, or Firm* — Osha Bergman Watanabe & Burton LLP (57) ABSTRACT

An electric fan includes a boss part; an outer peripheral part around the boss part; a rotor blade between the boss part and the outer peripheral part and rotatably supported about the boss part; a drive unit on the outer peripheral part to rotate the rotor blade; and a stator vane on a downstream side of the rotor blade in a flowing direction of fluid between the boss part and the outer peripheral part. The stator vane includes main bodies spaced apart in a peripheral direction, and one of the main bodies that is in a region where an obstacle is disposed on a radially outside is provided with a guide part that guides fluid to an inner diameter side, on a leading edge part on an upstream side in the flowing direction of fluid or an end portion on a suction surface side, on the inner diameter side.

10 Claims, 5 Drawing Sheets

(51) Int. Cl.
*B64D 27/31* (2024.01)
*B64D 27/34* (2024.01)
*F01D 9/02* (2006.01)

(52) U.S. Cl.
CPC .............. *B64D 27/34* (2024.01); *F01D 9/02* (2013.01); *F05D 2220/90* (2013.01)

(56) References Cited

U.S. PATENT DOCUMENTS

| | | | |
|---|---|---|---|
| 2016/0023754 A1* | 1/2016 | Wiegand | B64C 29/0025 244/17.11 |
| 2019/0023376 A1 | 1/2019 | Nan | |
| 2022/0063820 A1 | 3/2022 | Uruma et al. | |
| 2023/0048852 A1 | 2/2023 | Ohashi et al. | |

OTHER PUBLICATIONS

Written Opinion issued in corresponding International Application No. PCT/JP2022/027464, dated Sep. 13, 2022 (8 pages).

* cited by examiner

ELECTRIC FAN AND ELECTRIC VERTICAL TAKEOFF/LANDING AIRCRAFT

FIELD

The present disclosure relates to an electric fan and an electric vertical takeoff/landing aircraft including a drive unit on the outer peripheral side.

BACKGROUND

In recent years, as one of flying cars, an electric vertical takeoff/landing aircraft that can take off and land vertically has been developed. For example, the electric vertical takeoff/landing aircraft includes a plurality of electric fans on the airframe, and the angle of the electric fans can be adjusted with respect to the airframe. That is, during the takeoff and landing of the electric vertical takeoff/landing aircraft, the electric fans are directed in an up-and-down direction, and during the flight, the electric fans are directed in a front-and-rear direction. As an electric fan for the electric vertical takeoff/landing aircraft, an outer periphery drive fan in which a drive unit is disposed on the outer peripheral part is applied. For example, such an electric fan for the electric vertical takeoff/landing aircraft is disclosed in the following Patent Literature.

CITATION LIST

Patent Literature

Patent Literature 1: Japanese Patent Application Laid-open No. 2020-93705

SUMMARY

Technical Problem

The outer periphery drive fan is applied when the traveling speed of the airframe is relatively slow. A plurality of the outer periphery drive fans are arranged side by side in the vicinity of a blade. In the outer periphery drive fan, a rotor blade is disposed on the upstream side in the flowing direction of air, and a stator vane is disposed on the downstream side. In the outer periphery drive fan, when the rotor blade is driven to rotate, the ambient air is taken inside, and rectified by the stator vane. In this process, the outer periphery drive fan may not be able to take in a sufficient amount of ambient air, because the nearby blade, another outer periphery drive fan adjacent thereto, or the like may become an obstacle. In this case, the inflow of air is reduced. Moreover, to obtain the maximum thrust force, it is preferable to design the outer periphery drive fan to have a small boss ratio. Subsequently, in particular, in a region of the rotor blade where the inflow of air is reduced, the flow velocity and pressure are reduced on the inner diameter side than those on the outer diameter side, and the pressure of the air with reduced flow velocity is recovered by the stator vane. Therefore, the pressure of the air that has flowed to the stator vane rises sharply on the inner diameter side. Hence, the air is separated from the surface of the stator vane, and causes a pressure loss.

An object of the present disclosure is to solve the problems described above, and to provide an electric fan and an electric vertical takeoff/landing aircraft that suppress the separation of air from the stator vane and suppress the pressure loss.

Solution to Problem

In order to achieve the above object, an electric fan according to the present disclosure includes: a boss part; an outer peripheral part disposed around the boss part; a rotor blade disposed between the boss part and the outer peripheral part and rotatably supported about the boss part; a drive unit provided on the outer peripheral part to rotate the rotor blade; and a stator vane disposed on a downstream side of the rotor blade in a flowing direction of fluid between the boss part and the outer peripheral part. The stator vane includes a plurality of stator vane main bodies disposed spaced apart in a peripheral direction, and among the stator vane main bodies, the stator vane main body located in a region where an obstacle is disposed on a radially outside is provided with a guide part that guides fluid to an inner diameter side, on a leading edge part on an upstream side in the flowing direction of fluid or an end portion on a suction surface side, on the inner diameter side.

Further, an electric fan according to the present disclosure includes: a boss part; an outer peripheral part disposed around the boss part; a rotor blade disposed between the boss part and the outer peripheral part and rotatably supported about the boss part; a drive unit provided on the outer peripheral part to rotate the rotor blade; and a stator vane disposed on a downstream side of the rotor blade in a flowing direction of fluid between the boss part and the outer peripheral part. The stator vane includes a plurality of stator vane main bodies disposed spaced apart in a peripheral direction, and among the stator vane main bodies, a peripheral space of the stator vane main bodies located in a region where an obstacle is disposed on a radially outside is smaller than a peripheral space of the stator vane main bodies not located in the region.

Further, an electric vertical takeoff/landing aircraft according to the present disclosure includes the above-described electric fan.

Advantageous Effects of Invention

With the electric fan and the electric vertical takeoff/landing aircraft of the present disclosure, it is possible to suppress the separation of air from the stator vane and suppress the pressure loss.

DESCRIPTION OF EMBODIMENTS

Hereinafter, preferred embodiments of the present disclosure will be described in detail with reference to the accompanying drawings. It is to be noted that the present disclosure is not limited to the embodiment, and in the case where there are a plurality of embodiments, the present disclosure also includes those configured by combining the embodiments. Moreover, the components in the embodiments include components that can be easily assumed by those skilled in the art, components that are substantially the same, and components that fall within what is called range of equivalents.

First Embodiment

<Electric Vertical Takeoff/Landing Aircraft>

Figure 1:
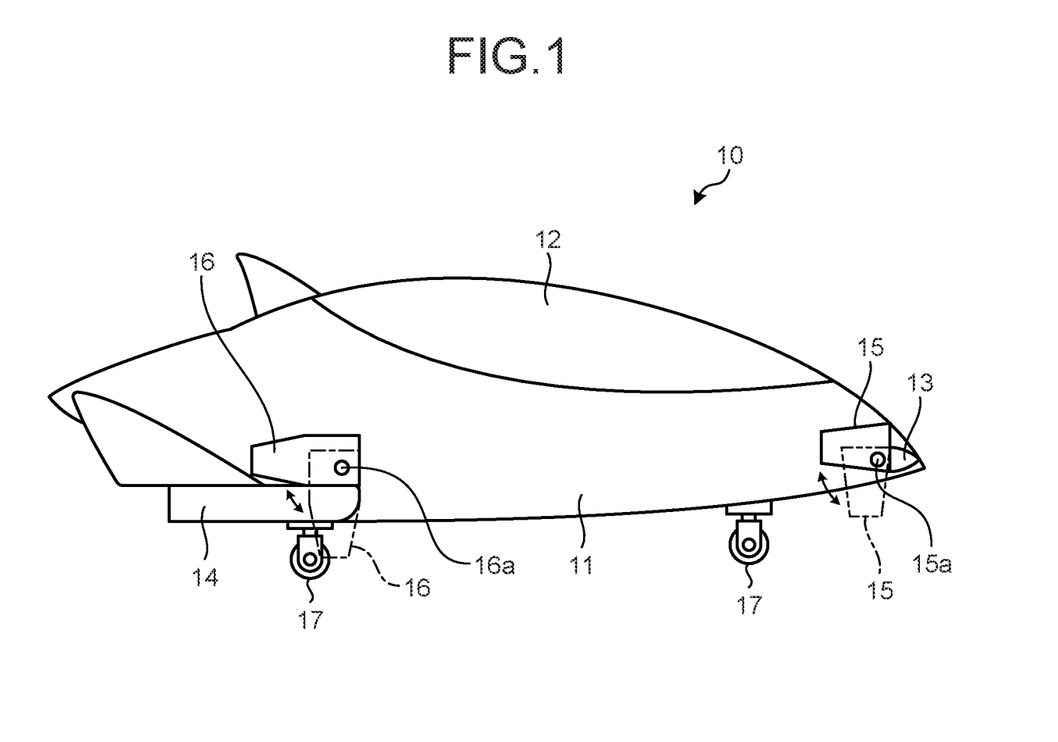
FIG. 1 is a side view illustrating an electric vertical takeoff/landing aircraft.

FIG. 1 is a side view illustrating an electric vertical takeoff/landing aircraft.

In the first embodiment, as illustrated in FIG. 1, an electric vertical takeoff/landing aircraft 10 includes an airframe 11, a driver's seat 12, a front blade 13, a rear blade 14, a front electric fan unit 15, a rear electric fan unit 16, and a traveling wheel 17.

The driver's seat 12 is provided on the upper part of the airframe 11. A pair of front blades 13 extending to the left and right is provided on the airframe 11 on the front part in the traveling direction, and a pair of rear blades 14 extending to the left and right is provided on the rear part in the traveling direction. The front electric fan unit 15 is provided on each of the pair of front blades 13, and the rear electric fan unit 16 is provided on each of the pair of rear blades 14. The front electric fan unit 15 includes a plurality of electric fans arranged side by side in the horizontal direction. The rear electric fan unit 16 includes a plurality of electric fans arranged side by side in the horizontal direction. Moreover, a plurality of traveling wheels 17 are attached to the lower part of the airframe 11.

The front electric fan unit 15 is rotatably supported on the front blade 13 about a supporting shaft 15a along the horizontal direction. The front electric fan unit 15 can be moved to the elevated position along the vertical direction (two-dot chain line position in FIG. 1) and the flight position along the front-and-rear direction (solid line position in FIG. 1), by being rotated by a drive device, which is not illustrated. Moreover, the rear electric fan unit 16 is rotatably supported on the rear blade 14 about a supporting shaft 16a along the horizontal direction. The rear electric fan unit 16 can be moved to the elevated position along the vertical direction (two-dot chain line position in FIG. 1) and the flight position along the front-and-rear direction (solid line position in FIG. 1), by being rotated by a drive device, which is not illustrated.

Therefore, in a state where the electric vertical takeoff/landing aircraft 10 is stopped on the ground, the front electric fan unit 15 and the rear electric fan unit 16 are driven in the elevated position. Subsequently, buoyancy is generated by the front electric fan unit 15 and the rear electric fan unit 16 to lift the airframe 11. Then, in a state where the electric vertical takeoff/landing aircraft 10 is in the air, the front electric fan unit 15 and the rear electric fan unit 16 are set to the flight position. Subsequently, thrust is generated by the front electric fan unit 15 and the rear electric fan unit 16 to move the airframe 11 forward in the air.

Figure 2:
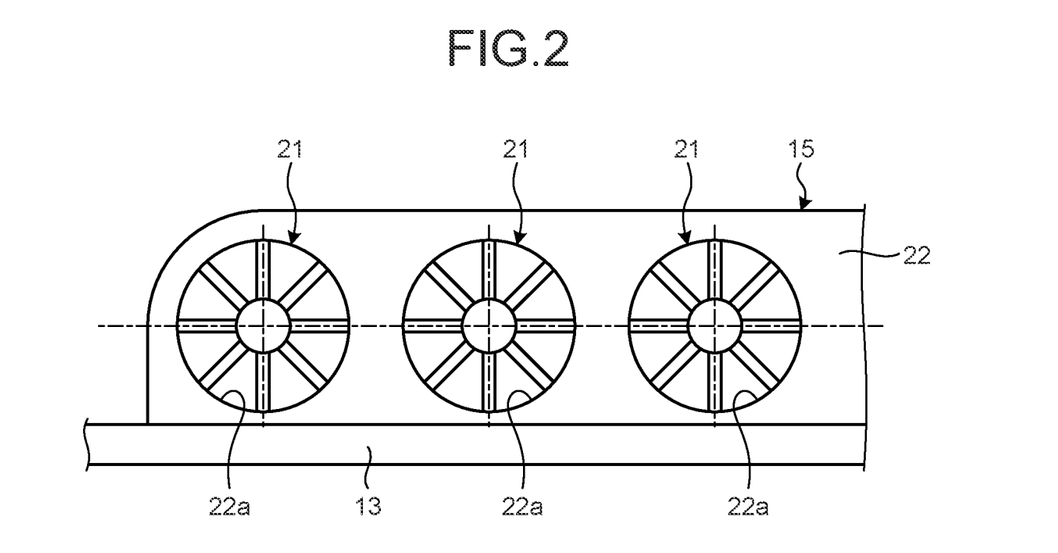
FIG. 2 is a front view illustrating a part of a front electric fan unit in the electric vertical takeoff/landing aircraft.

In the following, the front electric fan unit 15 and the rear electric fan unit 16 will be described. However, because the configurations of the front electric fan unit 15 and the rear electric fan unit 16 are substantially the same, only the front electric fan unit 15 will be described. FIG. 2 is a front view illustrating a part of a front electric fan unit in the electric vertical takeoff/landing aircraft.

As illustrated in FIG. 2, the front electric fan unit 15 is disposed on the upper part of the front blade 13. The front electric fan unit 15 includes a plurality of electric fans 21 disposed spaced apart in the horizontal direction. That is, a frame 22 is integrally provided on the upper part of the front blade 13. In the frame 22, a plurality of housing parts 22a that penetrate through the frame 22 in the front-and-rear direction are provided spaced apart in the left-and-right direction. The electric fans 21 are each installed in the housing parts 22a of the frame 22. Each of the electric fans 21 sucks in air from the front suction port, compresses the air inside, generates pressurized air, and discharges the pressurized air from a rear discharge port.

The electric fan 21 is applicable to the electric vertical takeoff/landing aircraft 10 in which the flight speed of the airframe 11 is relatively slow. For example, the traveling speed of the airframe 11 is greater than Mach 0 and equal to or less than Mach 0.2. Then, the flow velocity of the pressurized air compressed inside the electric fan 21 is equal to or less than Mach 0.5. The electric fan 21 is disposed in the vicinity of the front blade 13 (in the present embodiment, above), and another electric fan 21 is disposed adjacent to the electric fan 21 in the horizontal direction. As will be described below, in the electric fan 21, the rotor blade and the stator vane are disposed in the traveling direction of the airframe. Therefore, in the electric fan 21, when the rotor blade is driven to rotate, the front ambient air is taken inside, compressed, and rectified by the stator vane. In this process, the front blade 13 or the other electric fan 21 in the vicinity becomes an obstacle, and it becomes difficult for the electric fan 21 to take in a sufficient amount of ambient air. Hence, the inflow of air is reduced. The electric fan 21 of the present embodiment solves this problem.

<Electric Fan>

Figure 3:
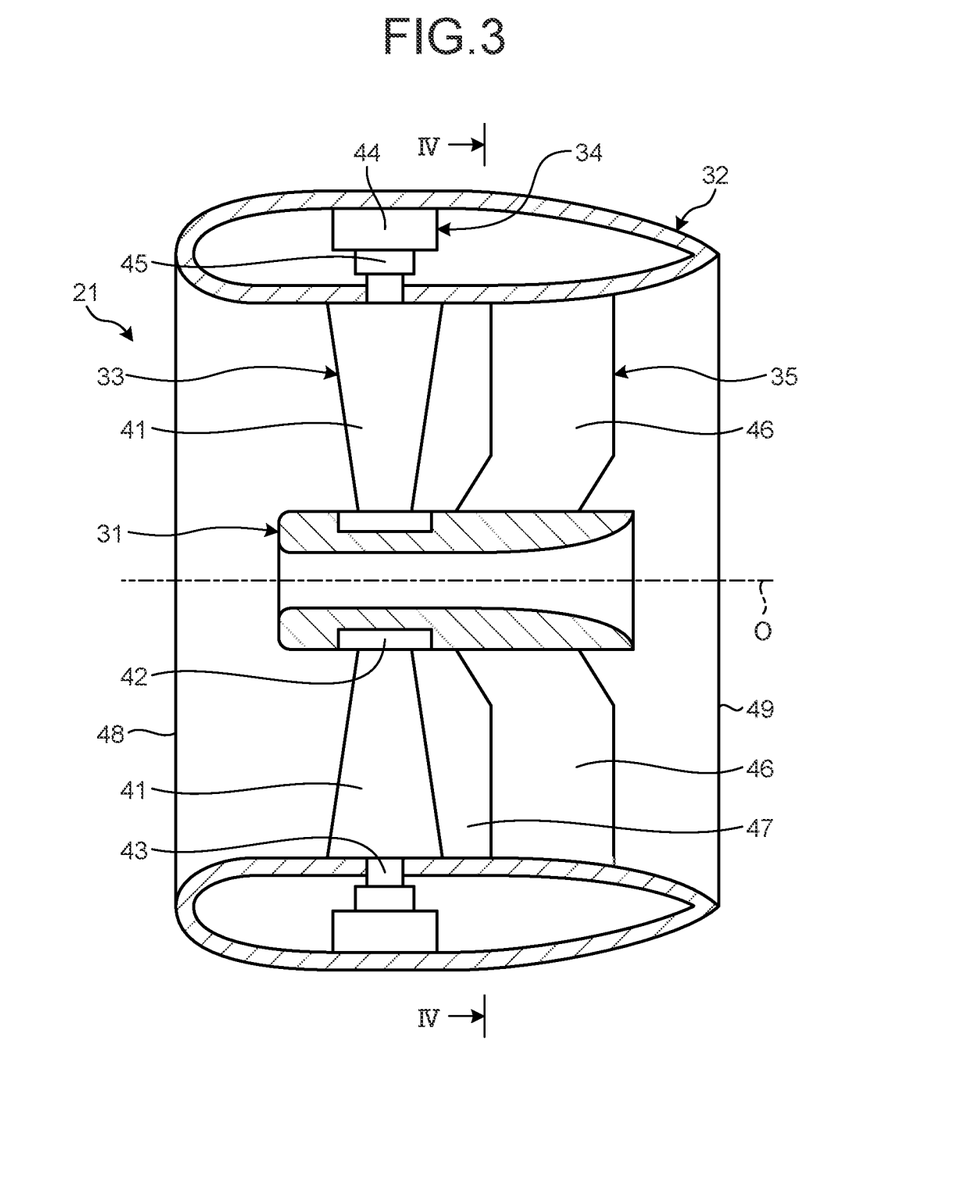
FIG. 3 is a sectional view illustrating an electric fan of a first embodiment.
Figure 4:
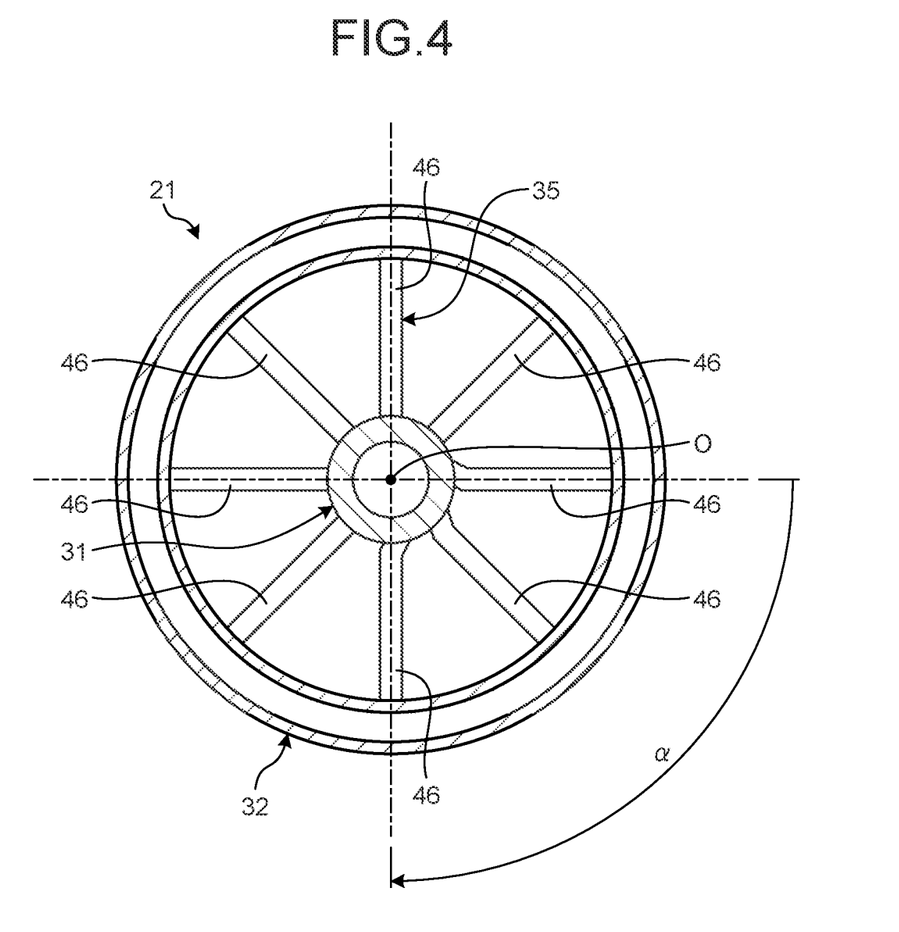
FIG. 4 is a sectional view cut along line IVI-IV in FIG. 3 illustrating a stator vane of the electric fan.

FIG. 3 is a sectional view illustrating the electric fan of the first embodiment. FIG. 4 is a sectional view cut along line IV-IV in FIG. 3 illustrating a stator vane of the electric fan.

As illustrated in FIG. 3 and FIG. 4, the electric fan 21 is an outer periphery drive fan. The electric fan 21 includes a boss part 31, an outer peripheral part 32, a rotor blade 33, a drive unit 34, and a stator vane 35.

The boss part 31 is disposed on a center axis O of the electric fan 21, along the longitudinal direction of the center axis O. The boss part 31 is formed in a cylindrical shape. The outer peripheral part 32 is disposed around the boss part 31. The outer peripheral part 32 is formed in a cylindrical shape around the center axis O. The outer peripheral part 32 is formed in a hollow shape.

The rotor blade 33 is disposed between the boss part 31 and the outer peripheral part 32, and is rotatably supported about the center axis O. The rotor blade 33 includes a plurality (in the present embodiment, eight pieces) of rotor blade main bodies 41 disposed spaced apart in the peripheral direction. The rotor blade main bodies 41 are radially disposed with the center axis O as a fulcrum. An end portion on the radially inner side of each of the rotor blade main bodies 41 is connected to a first rotator 42. The first rotator 42 is formed in a cylindrical shape, and is rotatably supported on the outer peripheral part of the boss part 31. An end portion on the radially outer side of each of the rotor blade main bodies 41 is connected to a second rotator 43. The second rotator 43 is formed in a cylindrical shape, and is rotatably supported on the inner peripheral part of the outer peripheral part 32.

The drive unit 34 is provided on the outer peripheral part 32, and can rotate the rotor blade 33. The drive unit 34 includes a coil (electromagnet) 44 serving as a stator-side magnet, and a permanent magnet 45 serving as a rotor-side magnet. The coil 44 is formed in a ring shape, and is disposed inside the outer peripheral part 32. The permanent magnet 45 is disposed on the outer peripheral surface of the second rotator 43 of the rotor blade 33. The permanent magnet 45 is disposed such that the positive electrodes and negative electrodes are alternately arranged in the peripheral direction. The coil 44 and the permanent magnet 45 are disposed opposite to each other in the radial direction.

The stator vane 35 is disposed between the boss part 31 and the outer peripheral part 32. The stator vane 35 is disposed concentrically with the rotor blade 33, and is disposed on the downstream side of the rotor blade 33 in the flowing direction of air. The stator vane 35 includes a plurality (in the present embodiment, eight pieces) of stator vane main bodies 46 disposed spaced apart in the peripheral direction. The stator vane main bodies 46 are radially disposed with the center axis O as a fulcrum. An end portion on the radially inner side of each of the stator vane main bodies 46 is connected to the outer peripheral part of the boss part 31. An end portion on the radially outer side of each of the stator vane main bodies 46 is connected to the inner peripheral part of the outer peripheral part 32.

In the electric fan 21, the rotor blade 33 and the stator vane 35 are disposed between the boss part 31 and the outer peripheral part 32, and the drive unit 34 is disposed on the outer peripheral part 32. In the electric fan 21, a flow passage 47 formed in a cylindrical shape that is parallel to the center axis O is formed between the boss part 31 and the outer peripheral part 32. In the flow passage 47, a suction port 48 is provided on the rotor blade 33 side and a discharge port 49 is provided on the stator vane 35 side.

Therefore, when the coil 44 of the drive unit 34 is energized, a magnetic field is generated from the outer peripheral part 32 to the boss part 31, and a rotational power is applied to the permanent magnet 45. Subsequently, the rotational power of the permanent magnet 45 is transmitted to the rotor blade main bodies 41, that is, to the rotor blade 33 via the second rotator 43, and the rotor blade 33 is driven to rotate. When the rotor blade 33 rotates, the air in front of the boss part 31 and the outer peripheral part 32, and the air on the outer peripheral side of the outer peripheral part 32 are sucked in from the suction port 48 to the rotor blade 33. The rotating rotor blade 33 compresses the air, and the pressurized air flows through the flow passage 47 and is rectified by the stator vane 35. In this process, thrust is generated when the pressurized air flows through the flow passage 47.

Incidentally, as described above, because the flow velocity of the air flowing inside the electric fan 21 applied to the electric vertical takeoff/landing aircraft 10 is low, if there is an obstacle in the vicinity, the electric fan 21 cannot take in a sufficient amount of air. Moreover, to obtain the maximum thrust force, the boss ratio (boss diameter/rotor blade diameter) in the electric fan 21 is small. Hence, in the rotor blade 33, the flow velocity and pressure of the air are reduced on the inner diameter side than those of the outer diameter side, and is recovered by the stator vane 35. Subsequently, the pressure of the air that has flowed to the stator vane 35 rises sharply on the inner diameter side. Hence, the high-pressure air is separated from the surface of the stator vane main body 46, and causes a pressure loss.

Thus, in the electric fan 21 of the first embodiment, among the stator vane main bodies 46, the stator vane main body 46 located in a region α where an obstacle is disposed on the radially outside, is provided with a guide part that guides air to the inner diameter side, on the leading edge part on the upstream side in the flowing direction of air or the end portion on the suction surface side, on the inner diameter side.

The electric fan 21 includes the rotor blade 33 and the stator vane 35, and the stator vane 35 includes the stator vane main bodies 46. The electric fan 21 has the region α where the rotor blade 33 cannot take in a sufficient amount of air, because an obstacle is disposed on the radially outside. In the first embodiment, the shape of the inner diameter side of the stator vane main body 46 that is disposed in the region α will be changed.

Figure 5:
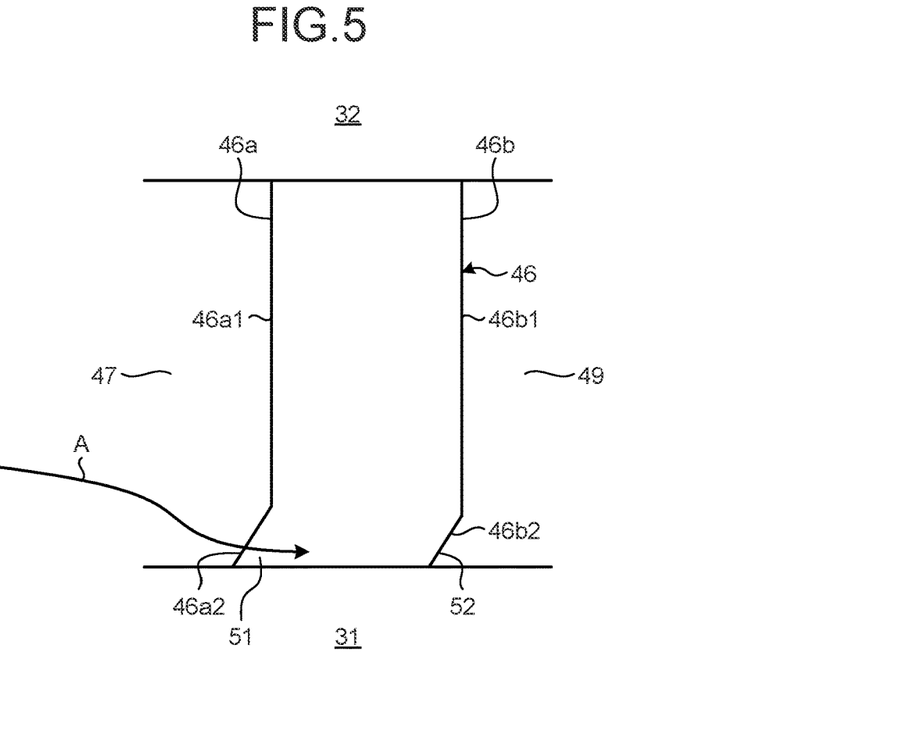
FIG. 5 is a side view illustrating a stator vane main body.
Figure 6:
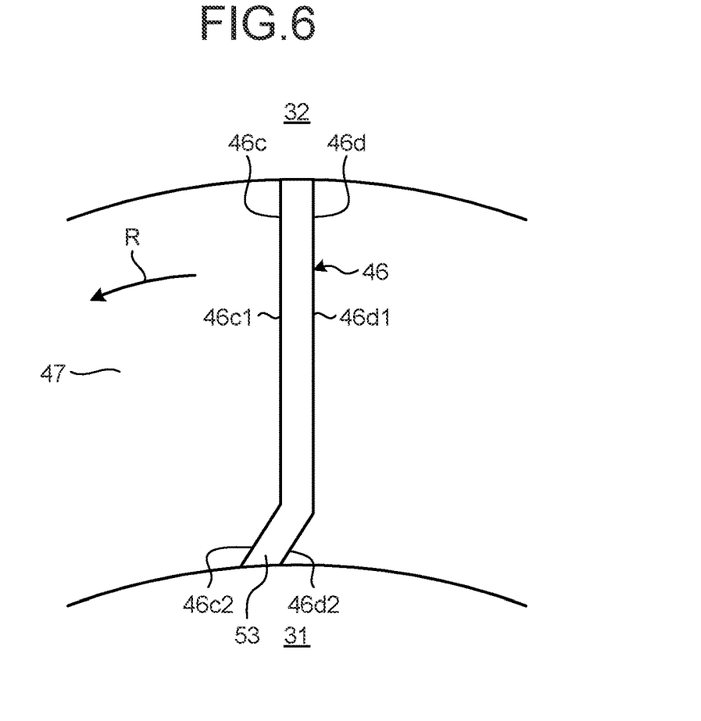
FIG. 6 is a front view illustrating the stator vane main body viewed from the upstream side in the flowing direction of fluid.

FIG. 5 is a side view illustrating the stator vane main body. FIG. 6 is a front view illustrating the stator vane main body viewed from the upstream side in the flowing direction of fluid.

As illustrated in FIG. 5, the guide part has an extending part 51 that extends from the leading edge part on the inner diameter side of the stator vane main body 46 to the upstream side in the flowing direction of air. That is, the stator vane main body 46 is disposed along the radial direction between the boss part 31 and the outer peripheral part 32, and includes a leading edge part 46a and a trailing edge part 46b. In FIG. 5, the leading edge part 46a and the trailing edge part 46b are in parallel. However, the leading edge part 46a and the trailing edge part 46b may not necessarily be in parallel. The leading edge part 46a includes a straight line part 46a1 and an inclined part 46a2. The straight line part 46a1 is formed in a straight line shape along the radial direction from the outer diameter side to the inner diameter side in the radial direction. The inclined part 46a2 is formed in a straight line shape that is inclined from an end on the inner diameter side of the straight line part 46a1 toward the upstream side in the flowing direction of air. The extending part 51 is formed by the inclined part 46a2.

Moreover, the trailing edge part 46b includes a straight line part 46b1 and an inclined part 46b2. The straight line part 46b1 is formed in a straight line shape along the radial direction from the outer diameter side to the inner diameter side in the radial direction. The inclined part 46b2 is formed in a straight line shape that is inclined from an end on the inner diameter side of the straight line part 46b1 toward the upstream side in the flowing direction of air. In the trailing edge part 46b, a notch part 52 is formed, because the end portion on the inner diameter side of the straight line part 46b1 is inclined toward the upstream side in the flowing direction of air, by the inclined part 46b2.

In this example, in FIG. 5, the straight line part 46a1 and the straight line part 46b1 are in parallel, and the inclined part 46a2 and the inclined part 46b2 are in parallel. If the inclination angles of the inclined parts 46a2 and 46b2 with respect to the straight line parts 46a1 and 46b1 become too large, the flow of pressurized air A may change abruptly, and may result in a reduction in efficiency. Hence, for example, the inclination angle is preferably between 3 degrees and 45 degrees. However, the inclination angles of the inclined part 46a2 and the inclined part 46b2 may be different from each other. Moreover, the trailing edge part 46b may only include the straight line part 46b1, and may not include the inclined part 46b2. Furthermore, in FIG. 5, the inclined part 46a2 of the extending part 51 and the inclined part 46b2 of the notch part 52 extend to the upstream side in the flowing direction of air toward the inner diameter side at a constant rate, and is formed in a straight line shape. However, the inclined part 46a2 of the extending part 51 and the inclined part 46b2 of the notch part 52 may also be formed in a curved shape in which the extending amount to the upstream side in the flowing direction of air is gradually increased or gradually decreased toward the inner diameter side.

Moreover, as illustrated in FIG. 6, the guide part includes a bending part 53 in which the end portion on the suction surface side of the stator vane main body 46 bends to the downstream side in a rotational direction R of the rotor blade 33. That is, the stator vane main body 46 is disposed along the radial direction between the boss part 31 and the outer peripheral part 32, and has a suction surface 46c that is the back side and a pressure surface 46d that is the front side. The suction surface 46c and the pressure surface 46d are in parallel. However, the suction surface 46c and the pressure surface 46d may not necessarily be in parallel. The suction surface 46c includes a straight line part 46c1 and an inclined part 46c2. The straight line part 46c1 is formed in a straight line shape along the radial direction from the outer diameter side to the inner diameter side in the radial direction. The inclined part 46c2 is formed in a straight line shape inclined from an end on the inner diameter side of the straight line part 46c1 toward the downstream side in the rotational direction R of the rotor blade 33.

Moreover, the pressure surface 46d includes a straight line part 46d1 and an inclined part 46d2. The straight line part 46d1 is formed in a straight line shape along the radial direction from the outer diameter side to the inner diameter side in the radial direction. The inclined part 46d2 is formed in a straight line shape that is inclined from an end on the inner diameter side of the straight line part 46d1 toward the downstream side in the rotational direction R of the rotor blade 33. The bending part 53 is formed by the inclined parts 46c2 and 46d2.

In this example, the straight line part 46c1 and the straight line part 46d1 are in parallel, and the inclined part 46c2 and the inclined part 46d2 are in parallel. Therefore, the thickness of the stator vane main body 46 is constant at least along the radial direction. If the inclination angles of the inclined parts 46c2 and 46d2 with respect to the straight line parts 46c1 and 46d1 become too large, the flow of the pressurized air A (see FIG. 5) may change abruptly, and may result in a reduction in efficiency. Hence, for example, the inclination angle is preferably between 3 degrees and 45 degrees. However, the inclination angles of the inclined part 46c2 and the inclined part 46d2 may be different from each other. Moreover, the pressure surface 46d may only include the straight line part 46d1, and may not include the inclined part 46d2. Furthermore, in FIG. 6, the bending part 53 is formed in a straight line shape in which the bending amount toward the downstream side in the rotational direction R of the rotor blade 33 is constant. However, the bending part 53 may also be formed in a curved shape in which the bending amount to the downstream side in the rotational direction R of the rotor blade 33 is gradually increased or gradually decreased toward the inner diameter side.

In the first embodiment, the extending part 51, the notch part 52, and the bending part 53 are each provided as a guide part. In this example, the notch part 52 may be omitted as a guide part. Moreover, at least one of the extending part 51 and the bending part 53 may be provided.

Therefore, the air taken in from the suction port 48 due to the rotation of the rotor blade 33, is compressed by the rotating rotor blade 33, flows through the flow passage 47 as the pressurized air, and arrives at the stator vane 35. In this example, the extending part 51 is provided on the inner diameter side of the stator vane main body 46. Hence, the pressurized air A that flows through the flow passage 47 is guided to the boss part 31 side, that is, to the extending part 51 side, and is brought close to the surface on the inner diameter side of the stator vane main body 46. Accordingly, the flow of the pressurized air A that flows along the stator vane main body 46 is increased. Subsequently, even if the pressure of the air that has flowed from the rotor blade 33 to the stator vane 35 rises on the inner diameter side, the high-pressure air is less likely to separate from the surface of the stator vane main body 46.

Moreover, the inner diameter side of the stator vane main body 46 is provided with the bending part 53. Hence, the pressurized air A that flows through the flow passage 47 is guided to the boss part 31 side, that is, to the extending part 51 side, and is brought close to the surface on the inner diameter side of the stator vane main body 46. Accordingly, the flow of the pressurized air A that flows along the stator vane main body 46 is increased. Subsequently, even if the pressure of the air that has flowed from the rotor blade 33 to the stator vane 35 rises on the inner diameter side, the high-pressure air is less likely to separate from the surface of the stator vane main body 46.

The phenomenon of the separation of the high-pressure air flowing through the flow passage 47 from the surface of the stator vane main body 46 tends to occur in the stator vane main body 46 in the region α where it is difficult to take in a sufficient amount of air, because an obstacle is disposed on the radially outside of the electric fan 21. Therefore, by suppressing the separation of air at the stator vane main body 46 disposed in the region α, it is possible to reduce the pressure loss.

Second Embodiment

Figure 7:
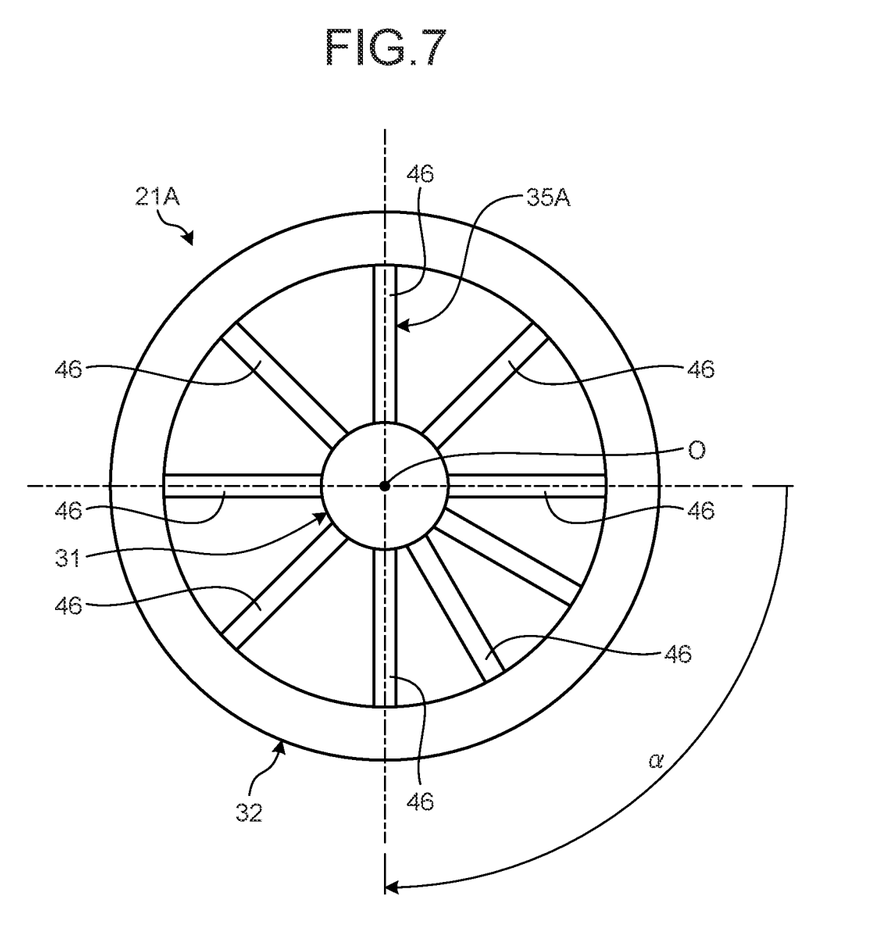
FIG. 7 is a front view illustrating a stator vane of an electric fan of a second embodiment.

FIG. 7 is a front view illustrating a stator vane of an electric fan of a second embodiment. The basic configuration of the second embodiment is the same as that of the first embodiment described above, and will be described with reference to FIG. 3. Members having the same functions as those of the first embodiment described above are denoted by the same reference numerals and the detailed description thereof will be omitted.

In the second embodiment, as illustrated in FIG. 3 and FIG. 7, an electric fan 21A includes the boss part 31, the outer peripheral part 32, the rotor blade 33, the drive unit 34, and a stator vane 35A. In this example, the boss part 31, the outer peripheral part 32, the rotor blade 33, and the drive unit 34 are the same as those in the first embodiment.

The stator vane 35A includes a plurality (in the present embodiment, nine pieces) of stator vane main bodies 46 disposed spaced apart in the peripheral direction. The electric fan 21A has the region α where an obstacle is disposed on the radially outside. In the stator vane 35A, among the stator vane main bodies 46, the peripheral space of the stator vane main bodies 46 located in the region α is narrower than the peripheral space of the stator vane main bodies 46 not located in the region α.

That is, the stator vane main bodies 46 not located in the region α are disposed at 22.5 degree intervals in the peripheral direction. On the other hand, the stator vane main bodies 46 located in the region α are disposed at 15 degree intervals in the peripheral direction. The density of the stator vane main bodies 46 in the peripheral direction located in the region α is higher than the density of the stator vane main bodies 46 in the peripheral direction not located in the region α.

Therefore, the air taken in from the suction port 48 due to the rotation of the rotor blade 33, is compressed by the rotating rotor blade 33, flows through the flow passage 47 as the pressurized air, and arrives at the stator vane 35. In this example, the peripheral space of the stator vane main bodies 46 located in the region α is narrow. Hence, even if the pressure of the pressurized air that flows through the flow passage 47 is increased on the inner diameter side of the stator vane 35, the pressure rise per stator vane main body 46 is reduced. Consequently, it is possible to suppress the separation of high-pressure air from the surface of the stator vane main body 46.

The number of stator vane main bodies 46 in the stator vane 35A is not limited to the embodiment described above.

[Action and Effect of Present Embodiment]

The electric fan according to a first aspect includes the boss part 31, the outer peripheral part 32 disposed around the boss part 31, the rotor blade 33 disposed between the boss part 31 and the outer peripheral part 32 and that is rotatably supported about the boss part 31, the drive unit 34 provided on the outer peripheral part 32 and that can rotate the rotor blade 33, and the stator vane 35 disposed on the downstream side of the rotor blade 33 in the flowing direction of air between the boss part 31 and the outer peripheral part 32. The stator vane 35 includes the stator vane main bodies 46 disposed spaced apart in the peripheral direction, and among the stator vane main bodies 46, the stator vane main body 46 located in the region q where an obstacle is disposed on the radially outside is provided with the guide part that guides air to the inner diameter side, on the leading edge part 46a on the upstream side in the flowing direction of air or the end portion on the suction surface 46c side, on the inner diameter side.

With the electric fan according to the first aspect, when the pressurized air compressed by the rotor blade 33 flows to the stator vane 35, the pressurized air is guided to the inner diameter side of the stator vane main body 46 by the guide part. Hence, even if the pressure of the air that has flowed from the rotor blade 33 to the stator vane 35 rises on the inner diameter side, the high-pressure air is less likely to separate from the surface of the stator vane main body 46. As a result, it is possible to suppress the separation of air from the stator vane 35 and suppress the pressure loss.

The electric fan according to a second aspect includes the extending part 51 that extends from the leading edge part 46a to the upstream side in the flowing direction of air, as a guide part. As a result, the pressurized air is guided to the inner diameter side of the stator vane main body 46 by the extending part 51, and it is possible to suppress the separation of air from the surface of the stator vane main body 46 with a simple configuration.

In the electric fan according to a third aspect, the extending amount of the extending part 51 that extends to the upstream side in the flowing direction of fluid is increased toward the inner diameter side. As a result, it is possible to appropriately guide the pressurized air to the inner diameter side of the stator vane main body 46.

In the electric fan according to a fourth aspect, the stator vane main body 46 has the trailing edge part 46b on the downstream side in the flowing direction of air, that bends to the upstream side in the flowing direction of air, on the inner diameter side. As a result, the pressurized air is guided to the inner diameter side of the stator vane main body 46. Hence, it is possible to suppress the separation of air from the surface of the stator vane main body 46 with a simple configuration.

The electric fan according to a fifth aspect includes the bending part 53 in which the end portion on the suction surface 46c side bends to the downstream side in the rotational direction of the rotor blade 33, as a guide part. As a result, the pressurized air is guided to the inner diameter side of the stator vane main body 46 by the bending part 53. Hence, it is possible to suppress the separation of air from the surface of the stator vane main body 46 with a simple configuration.

In the electric fan according to a sixth aspect, the thickness of the stator vane main body 46 is constant along the radial direction. As a result, it is possible to suppress an increase in weight due to an increase in the thickness of the stator vane main body 46.

In the electric fan according to a seventh aspect, among the stator vane main bodies 46, the peripheral space of the stator vane main bodies 46 located in the region α is narrower than the peripheral space of the stator vane main bodies 46 not located in the region α. As a result, the pressure rise per stator vane main body 46 is reduced. Hence, it is possible to suppress the separation of air from the surface of the stator vane main body 46.

In the electric fan according to an eighth aspect, the maximum speed of the air that flows through the rotor blade 33 and the stator vane 35 is set to equal to or less than Mach 0.5. As a result, even if the speed of the air flowing inside is slow and even if there is an obstacle in the vicinity, sufficient thrust can be obtained.

The electric fan according to a ninth aspect includes the boss part 31, the outer peripheral part 32 disposed around the boss part 31, the rotor blade 33 disposed between the boss part 31 and the outer peripheral part 32 and that is rotatably supported about the boss part 31, the drive unit 34 provided on the outer peripheral part 32 and that can rotate the rotor blade 33, and the stator vane 35 disposed on the downstream side of the rotor blade 33 in the flowing direction of air between the boss part 31 and the outer peripheral part 32. The stator vane 35 includes the stator vane main bodies 46 disposed spaced apart in the peripheral direction. Among the stator vane main bodies 46, the peripheral space of the stator vane main bodies 46 located in the region α where an obstacle is disposed on the radially outside is made smaller than the peripheral space of the stator vane main bodies 46 not located in the region α.

With the electric fan according to the ninth aspect, even if the pressurized air compressed by the rotor blade 33 flows to the stator vane 35, and the pressure of the pressurized air is increased on the inner diameter side of the stator vane 35, the pressure rise per stator vane main body 46 is reduced. Hence, it is possible to suppress the separation of high-pressure air from the surface of the stator vane main body 46. As a result, it is possible to suppress the separation of air from the stator vane 35 and suppress the pressure loss.

The electric vertical takeoff/landing aircraft according to a tenth aspect includes the electric fans 21 and 21A. As a result, it is possible to suppress the separation of air from the stator vane 35 in the electric fans 21 and 21A, and suppress the pressure loss. Hence, it is possible to suppress a reduction in thrust.

In the embodiments described above, the electric fan of the present invention is applied to the electric vertical takeoff/landing aircraft. However, the electric fan may also be applied to a helicopter, a drone, an air cushion vehicle such as a hovercraft, a ship, and the like.

REFERENCE SIGNS LIST

10 Electric vertical takeoff/landing aircraft
11 Airframe
12 Driver's seat
13 Front blade
14 Rear blade 15 Front electric fan unit
15a Supporting shaft
16 Rear electric fan unit
16a Supporting shaft
17 Traveling wheel
21, 21A Electric fan
22 Frame
31 Boss part
32 Outer peripheral part
33 Rotor blade
34 Drive unit
35, 35A Stator wane
41 Rotor blade main body
42 First rotator
43 Second rotator
44 Coil
45 Permanent magnet
46 Stator vane main body
47 Flow passage
48 Suction port
49 Discharge port
51 Extending part
52 Notch part
53 Bending part

The invention claimed is:

1. An electric fan unit, comprising:
a frame disposed on a blade; and
electric fans disposed at intervals on the frame, wherein each of the electric fans includes:
   a boss part;
   an outer peripheral around the boss part;
   a rotor blade disposed between the boss part and the outer peripheral and rotatably supported about the boss part;
   a driver disposed on the outer peripheral to rotate the rotor blade; and
   a stator vane disposed on a downstream side of the rotor blade in a flowing direction of fluid between the boss part and the outer peripheral,
the stator vane includes stator vane main bodies disposed apart from each other in a peripheral direction,
one of the stator vane main bodies is disposed adjacent the blade or disposed adjacent to another of the electric fans,
the one of the stator vane main bodies includes a guide that guides fluid to an inner diameter side of the stator vane, on a leading edge part of the stator vane on an upstream side of the stator vane in the flowing direction of fluid or an end portion of the stator vane on a suction surface side of the stator vane, and
a part of the guide extends from the leading edge part to the upstream side in the flowing direction of fluid.

2. The electric fan unit according to claim 1, wherein an extending amount of the part of the guide that extends to the upstream side increases toward the inner diameter side.

3. The electric fan unit according to claim 1, wherein in each of the stator vane main bodies, a trailing edge part on the downstream side in the flowing direction of fluid bends to the upstream side in the flowing direction of fluid, on the inner diameter side.

4. The electric fan unit according to claim 1, wherein the guide includes a bending part in which an end portion on a suction surface side bends to a downstream side in a rotational direction of the rotor blade.

5. The electric fan unit according to claim 4, wherein each of the stator vane main bodies has a constant thickness along a radial direction.

6. The electric fan unit according to claim 1, wherein among the stator vane main bodies, a peripheral space of the stator vane main bodies located in the region is smaller than a peripheral space of the stator vane main bodies not located in the region.

7. The electric fan unit according to claim 1, wherein a maximum speed of fluid that flows through the rotor blade and the stator vane is set to equal to or less than Mach 0.5.

8. An electric vertical takeoff/landing aircraft, comprising the electric fan unit according to claim 1.

9. An electric fan unit, comprising:
a frame disposed on a blade; and
electric fans disposed at intervals on the frame, wherein each of the electric fans includes:
   a boss part;
   an outer peripheral around the boss part;
   a rotor blade disposed between the boss part and the outer peripheral and rotatably supported about the boss part;
   a driver disposed on the outer peripheral to rotate the rotor blade; and
   a stator vane disposed on a downstream side of the rotor blade in a flowing direction of fluid between the boss part and the outer peripheral,
the stator vane includes stator vane main bodies disposed apart from each other in a peripheral direction, and
among the stator vane main bodies, a peripheral space of the stator vane main bodies located adjacent the blade or disposed adjacent to another of the electric fans is smaller than a peripheral space of the stator vane main bodies not located in the region.

10. An electric vertical takeoff/landing aircraft, comprising the electric fan unit according to claim 9.

* * * * *